US012781900B2

United States Patent
(12) United States Patent
Matsui et al.

(10) Patent No.: US 12,781,900 B2
(45) Date of Patent: *Nov. 3, 2026

(54) TUBE COUPLING

(71) Applicant: Panasonic Projector & Display Corporation, Osaka (JP)

(72) Inventors: Shigeyoshi Matsui, Osaka (JP); Toshihiko Matsuda, Fukuoka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/297,548

(22) Filed: Aug. 12, 2025

(65) Prior Publication Data

US 2025/0361963 A1 Nov. 27, 2025

Related U.S. Application Data

(63) Continuation of application No. 17/982,847, filed on Nov. 8, 2022, now Pat. No. 12,410,877.

(30) Foreign Application Priority Data

Nov. 9, 2021 (JP) ................................ 2021-182619

(51) Int. Cl.
*F16L 37/252* (2006.01)
*F16L 37/248* (2006.01)

(52) U.S. Cl.
CPC ........... *F16L 37/252* (2013.01); *F16L 37/248* (2013.01)

(58) Field of Classification Search
CPC ..... F16L 37/107; F16L 37/113; F16L 37/248; F16L 37/252; F16L 37/36
See application file for complete search history.

(56) References Cited

U.S. PATENT DOCUMENTS

| | | | |
|---|---|---|---|
| 4,611,662 | A | 9/1986 | Harrington |
| 5,042,152 | A | 8/1991 | Sasa |

(Continued)

FOREIGN PATENT DOCUMENTS

| | | |
|---|---|---|
| EP | 2818781 | 12/2014 |
| JP | 50-1061 | 1/1975 |

(Continued)

OTHER PUBLICATIONS

Notice of Reasons for Refusal dated May 27, 2025 in Japanese Patent Application No. 2021-182619, with English Translation.

(Continued)

*Primary Examiner* — Zachary T Dragicevich
(74) *Attorney, Agent, or Firm* — Wenderoth, Lind & Ponack, L.L.P.

(57) ABSTRACT

A tube coupling is configured to connect and couple two tubes for fluid flow. The tube coupling includes: a male connector including an insertion part having a protruding shape protruding in an axial direction that is an insertion direction; and a female connector including an insertion receiving part having a recessed shape recessed in the axial direction and configured to be coupled to the insertion part upon insertion of the insertion part into the insertion receiving part. The insertion part includes a projection on a side surface of the male connector. The insertion receiving part includes a through hole on a side surface of the female connector. The through hole extends in a direction inclined with respect to the axial direction, and is configured to allow the projection to move in the through hole.

5 Claims, 5 Drawing Sheets

(56) References Cited

U.S. PATENT DOCUMENTS

| | | | |
|---|---|---|---|
| 5,168,897 | A | 12/1992 | Vanderjagt |
| 5,316,041 | A | 5/1994 | Ramacier, Jr. et al. |
| 5,494,074 | A | 2/1996 | Ramacier, Jr. et al. |
| 2002/0011730 | A1 | 1/2002 | Stickan |
| 2010/0156095 | A1 | 6/2010 | Inoue |
| 2012/0139234 | A1 | 6/2012 | Kawamura |
| 2015/0001844 | A1 | 1/2015 | Tiberghien |
| 2015/0276110 | A1 | 10/2015 | Parekh |
| 2017/0248260 | A1 | 8/2017 | Okazaki |
| 2021/0199220 | A1 | 7/2021 | Truong |

FOREIGN PATENT DOCUMENTS

| | | |
|---|---|---|
| JP | 2-145392 | 12/1990 |
| JP | 6-33276 | 8/1994 |
| JP | 8-501135 | 2/1996 |
| JP | 8-503054 | 4/1996 |
| JP | 8-247366 | 9/1996 |
| JP | 11-33124 | 2/1999 |
| JP | 2003-526053 | 9/2003 |
| JP | 3482496 | 12/2003 |
| JP | 2006-300127 | 11/2006 |
| JP | 4096040 | 6/2008 |
| JP | 2011-140989 | 7/2011 |
| JP | 2015-190586 | 11/2015 |
| WO | 93/25838 | 12/1993 |
| WO | 94/04859 | 3/1994 |
| WO | 94/10494 | 5/1994 |
| WO | 01/35015 | 5/2001 |
| WO | 01/92769 | 12/2001 |
| WO | 2008/062654 | 5/2008 |
| WO | 2010/025877 | 3/2010 |
| WO | 2011/021348 | 2/2011 |

OTHER PUBLICATIONS

Decision of Refusal mailed Oct. 28, 2025 in Japanese Patent Application No. 2021-182619, with English translation.

FEMALE CONNECTOR

MALE CONNECTOR

TUBE COUPLING

CROSS-REFERENCE TO RELATED APPLICATIONS

This is a continuation application of U.S. patent application Ser. No. 17/982,847 filed on Nov. 8, 2022, which is based on and claims priority of Japanese Patent Application No. 2021-182619 filed on Nov. 9, 2021. The entire disclosures of the above-identified applications, including the specifications, drawings and claims are incorporated herein by reference in their entirety.

BACKGROUND

1. Technical Field

The present disclosure relates to a tube coupling including a male connector and a female connector that can be coupled to each other.

2. Description of the Related Art

There is a conventionally known quick connection coupling valve assembly that includes a male coupling member, a female coupling member, first and second poppet members, first and second sealing members, and a clip part (see, for example, Japanese Patent No. 3482496). In this quick connection coupling valve assembly, the respective poppet members of the male and female coupling members are axially movable. Each of the poppet members has a tip end, which protrudes from a housing member, and which tapers as the axial distance from the base end increases. A liquid seal member is provided between the poppet member and the housing member, and forms the maximum diameter at the tip end. A fluid flow is guided along the maximum diameter.

The above structure reduces a stroke amount required until sealing is made for the fluid at the time of decoupling, thus allowing quick decoupling.

SUMMARY

In a conventional coupling, a large force is required when a male connector is inserted straight into a female connector in the axial direction. Thus, the male connector is less likely to be easily inserted.

It is therefore an object of the present disclosure to provide a tube coupling in which a male connector can be inserted into a female connector with a small force.

A tube coupling according to the present disclosure is a tube coupling configured to connect and couple two tubes that are configured to cause a fluid to flow inside the two tubes. The tube coupling includes: a male connector including an insertion part having a protruding shape protruding in an axial direction that is an insertion direction; and a female connector including an insertion receiving part having a recessed shape recessed in the axial direction, the insertion receiving part being coupled to the insertion part when the insertion part is inserted into the insertion receiving part. The insertion part includes a projection disposed on a side surface of the male connector. The insertion receiving part includes a first through hole on a side surface of the female connector. The first through hole extends in a direction inclined with respect to the axial direction, and is configured to allow the projection to move in the first through hole. The male connector is connected to the female connector by guiding the projection in the axial direction along the first through hole of the female connector.

With a tube coupling according to the present disclosure, it is possible to insert a male connector into a female connector with a small force. Thus, even when a connector is disposed in a narrow space such as an inside space of an electronic device, it is possible to easily perform attachment and detachment work, therefore improving efficiency in parts replacement or the like.

DETAILED DESCRIPTION

Figure 1:
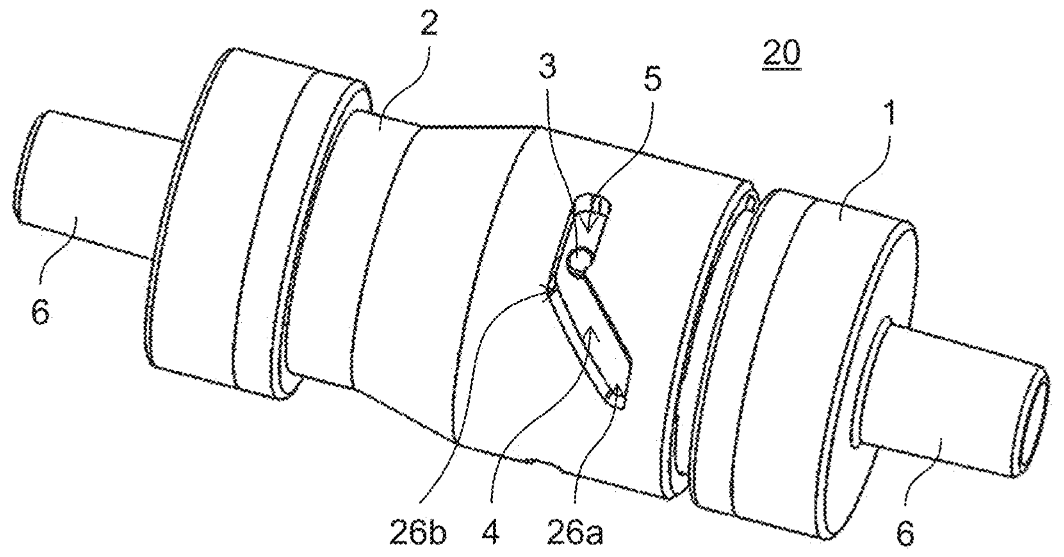
FIG. 1 is a schematic perspective view of a tube coupling according to a first exemplary embodiment, the view illustrating an outer appearance of the tube coupling in an open state where a flow path in the tube coupling is opened.

A tube coupling according to a first aspect is a tube coupling configured to connect and couple tubes that are configured to cause a fluid to flow inside the tubes. The tube coupling includes a male connector and a female connector. The male connector includes an insertion part having a protruding shape protruding in an axial direction that is an insertion direction. The female connector includes an insertion receiving part that has a recessed shape recessed in the axial direction and that is coupled to the insertion part when the insertion part is inserted into the insertion receiving part. The insertion part includes a projection on a side surface around the axial direction of the male connector. The insertion receiving part includes a first through hole that extends in a direction inclined with respect to the axial direction on a side surface around the axial direction of the female connector, and that is configured to accept the projection to move therein. The male connector is connected to the female connector by guiding the projection in the axial direction along the first through hole of the female connector.

A tube coupling according to a second aspect may be the tube coupling in the first aspect, in which the insertion receiving part may further include a second through hole. In this case, the second through hole is continuous with an end of the first through hole on the side in the axial direction, along the in-plane direction of the side surface, and extends in the circumferential direction substantially perpendicular to the axial direction, on the side surface extending in a direction intersecting the axial direction. The male connector may be connected to the female connector when the projection is fixed in the axial direction by the second through hole.

A tube coupling according to a third aspect may be the tube coupling in the second aspect, in which the male connector may be connected to the female connector by inserting the male connector into the female connector while the male connector is caused to rotate in the direction in which the first through hole extends. The position of the projection in the circumferential direction substantially perpendicular to the axial direction may be adjustable by guiding the projection from the first through hole to the second through hole.

A tube coupling according to a fourth aspect may be the tube coupling in the third aspect, in which the insertion receiving part may include a plurality of first through holes and a plurality of second through holes on the side surface around the axial direction, and in which a degree of freedom in an insertion position in the rotation direction of the projection that corresponds to a position of one of the plurality of first through holes may be adjustable.

Hereinafter, a tube coupling according to exemplary embodiments will be described with reference to the accompanying drawings. In the drawings, substantially the same members are denoted by the same reference signs.

First Exemplary Embodiment

Figure 2:
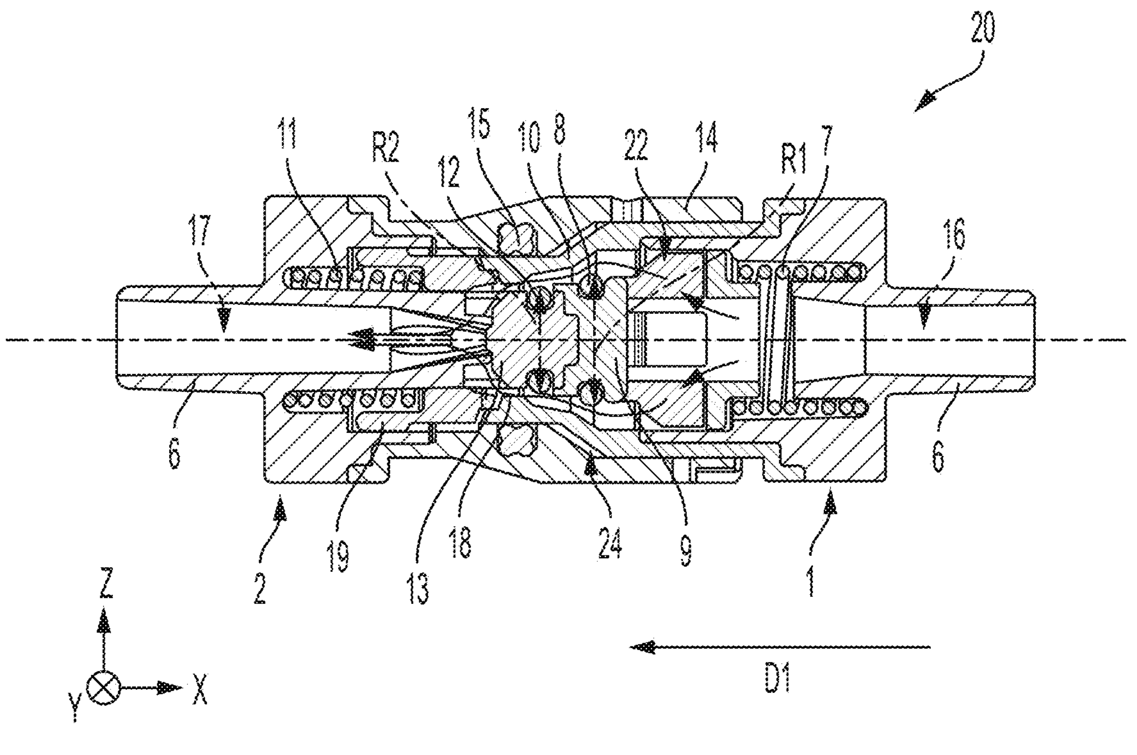
FIG. 2 is a cross-sectional view illustrating the tube coupling in FIG. 1, which is in the open state where the flow path is opened, as viewed from a direction perpendicular to an axial direction.
Figure 3:
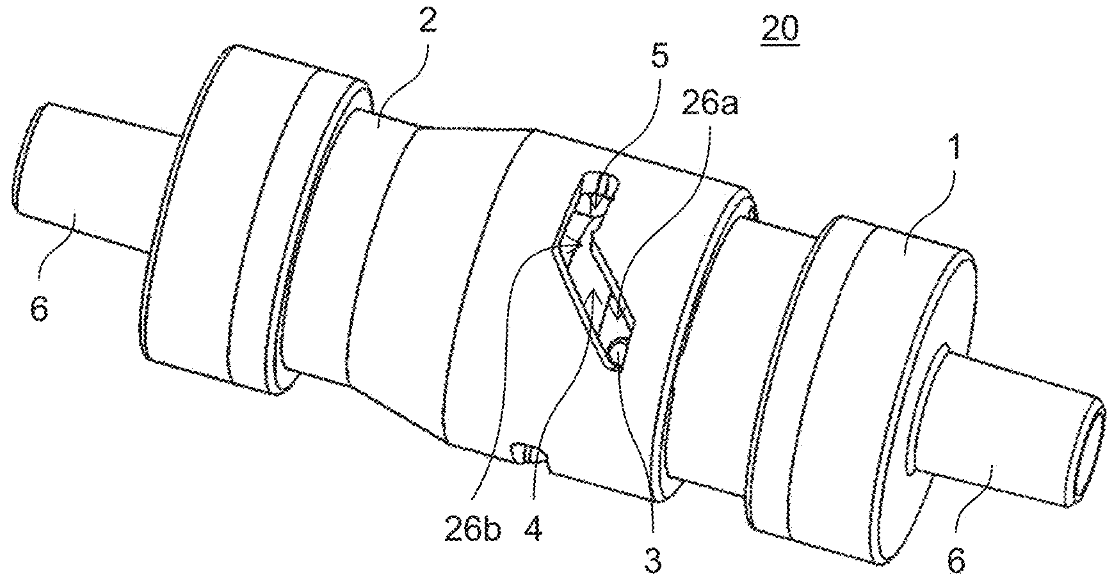
FIG. 3 is a schematic perspective view of the tube coupling according to the first exemplary embodiment, the view illustrating an outer appearance of the tube coupling in a closed state where the flow path in the tube coupling is closed.
Figure 4:
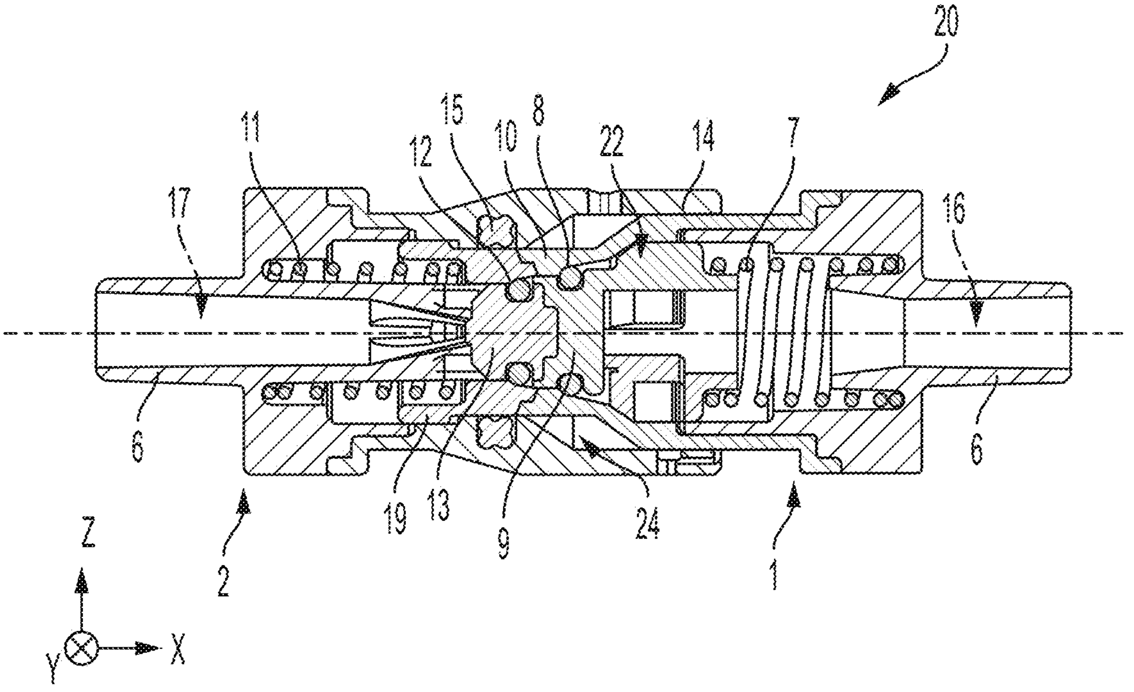
FIG. 4 is a cross-sectional view illustrating the tube coupling in FIG. 3, which is in the closed state where the flow path is closed, as viewed from the direction perpendicular to the axial direction.
Figure 5:
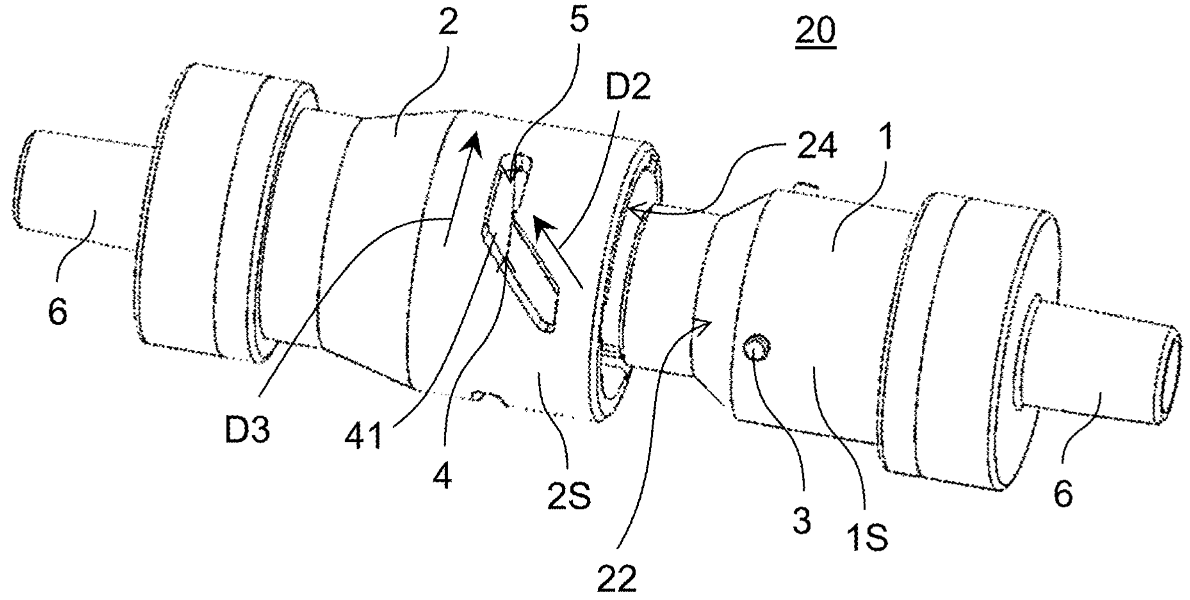
FIG. 5 is a schematic perspective view of the tube coupling according to the first exemplary embodiment, the view illustrating the tube coupling in a state before a male connector of the tube coupling is inserted into a female connector of the tube coupling.

FIG. 1 is a schematic perspective view of tube coupling 20 according to a first exemplary embodiment, the view illustrating an outer appearance of tube coupling 20 in an open state where flow path 18 in tube coupling 20 is opened. FIG. 2 is a cross-sectional view illustrating tube coupling 20 in FIG. 1, which is in the open state where flow path 18 is opened, as viewed from a direction perpendicular to an axial direction. FIG. 3 is a schematic perspective view of tube coupling 20 according to the first exemplary embodiment, the view illustrating an outer appearance of tube coupling 20 in a closed state where flow path 18 in tube coupling 20 is closed. FIG. 4 is a cross-sectional view illustrating tube coupling 20 in FIG. 3, which is in the closed state where flow path 18 is closed, as viewed from the direction perpendicular to the axial direction. FIG. 5 is a schematic perspective view of tube coupling 20 according to the first exemplary embodiment, the view illustrating tube coupling 20 in a state before male connector 1 of tube coupling 20 is inserted into female connector 2 of tube coupling 20.

For convenience, an axial direction, which is an insertion direction, is defined as an X-direction, one direction perpendicular to the X-direction on a horizontal plane is defined as a Y-direction, and a vertically upward direction is defined as a Z-direction.

Tube coupling 20 according to the first exemplary embodiment is a tube coupling for connecting and coupling two tubes (not illustrated). The two tubes are configured to cause a fluid to flow inside the two tubes. Tube coupling 20 includes male connector 1 and female connector 2.

Hereinafter, respective members that are components of tube coupling 20 will be described.

<Male Connector>

Male connector 1 includes insertion part 22 that has a protruding shape protruding in the axial direction (X-direction), which is insertion direction D1. As illustrated in FIG. 2, insertion part 22 protrudes in the insertion direction D1. Male connector 1 also includes, for example, first pipe 16 that is configured to cause a fluid to flow inside first pipe 16. Connection is made to the tube at tube connection part 6 formed at an end. First pipe 16 receives the fluid flowing from the tube.

<Insertion Part>

Insertion part 22 includes projection 3 on a side surface around the axial direction (X-direction) of male connector 1. That is, projection 3 is provided on side surface 1S (see FIG. 5) of male connector 1. Insertion part 22 has, for example, a protruding shape protruding in the axial direction (X-direction), and includes first pressing member 9, first seal member 8, and first outer peripheral member 10.

<Projection>

Projection 3 is not limited to a circular shape, and may be a polygonal shape such as a quadrangular shape. Note that friction can be further reduced when an edge of projection 3 is subjected to curved surface processing.

<First Pressing Member>

First pressing member 9 has a protruding shape protruding in the axial direction, and is biased outward in the axial direction (X-direction) by first spring 7 in a state where male connector 1 is not inserted into female connector 2.

<First Seal Member>

First seal member 8 has an annular shape, and is disposed around first pressing member 9. For example, an O-ring can be used for first seal member 8.

<First Outer Peripheral Member>

First outer peripheral member 10 supports first spring 7 in the axial direction (X-direction). First outer peripheral member 10 is spaced from first pressing member 9, and annularly surrounds a periphery in the axial direction (X-direction) of first pressing member 9.

When first pressing member 9 is biased by first spring 7, first outer peripheral member 10 is caused to abut on first seal member 8, and this causes flow path 18 between first pipe 16 of male connector 1 and second pipe 17 of female connector 2 to be closed. As a result, a closed state is obtained.

In contrast, when first spring 7 is compressed, first outer peripheral member 10 is separated from first seal member 8, and this causes flow path 18 between first pipe 16 and second pipe 17 to be opened. As a result, an open state is obtained.

First outer peripheral member 10 is connected to first pressing member 9 via first spring 7. Thus, the relative position in the axial direction between first outer peripheral member 10 and first pressing member 9 changes in accordance with an extended state and a compressed state of first spring 7.

<Female Connector>

Female connector 2 includes insertion receiving part 24 that has a recessed shape recessed in the axial direction (X-direction), and that is coupled to insertion part 22 when insertion part 22 is inserted into insertion receiving part 24. That is, insertion part 22 is inserted into insertion receiving part 24, as a result of which insertion receiving part 24 is coupled to insertion part 22. As illustrated in FIG. 2, insertion receiving part 24 is recessed in the insertion direction D1 (axial direction). Note that the insertion direction D1 is a direction in which insertion part 22 is inserted into insertion receiving part 24. Female connector 2 includes, for example, second pipe 17 that is configured to cause a fluid to flow inside second pipe 17, and also includes insertion receiving part 24 that has a recessed shape recessed in the axial direction (X-direction), and that is coupled to insertion part 22 when insertion part 22 is inserted into insertion receiving part 24. Connection is made to the tube at tube connection part 6 formed at an end. Second pipe 17 receives the fluid flowing from the tube.

<Insertion Receiving Part>

As illustrated in FIGS. 1 and 3, insertion receiving part 24 includes first through hole 4 that extends in a direction inclined with respect to the axial direction on a side surface around the axial direction (X-direction) of female connector 2, and that allows projection 3 to move therein. That is, first through hole 4 is provided on side surface 2S (see FIG. 5) of female connector 2, and extends in direction D2 inclined with respect to the axial direction. Projection 3 is movable in first through hole 4. Insertion receiving part 24 has, for example, a recessed shape recessed in the axial direction (X-direction), and includes second pressing member 13, second seal member 12, and second outer peripheral member 19.

<First Through Hole>

First through hole 4 extends in the direction inclined with respect to the axial direction on the side surface around the axial direction (X-direction) of female connector 2. First through hole 4 allows projection 3 to move therein.

Male connector 1 is connected to female connector 2 by guiding projection 3 in the axial direction along first through hole 4 of female connector 2.

When a hole is provided along the axial direction, it is necessary to push male connector 1 straight in the axial direction without rotating male connector 1. Thus, a large force is required. In contrast, first through hole 4 is provided so as to be inclined with respect to the axial direction, and thus it is possible to easily insert male connector 1 in the axial direction while male connector 1 is caused to rotate by using torque with a small force. First through hole 4 is inclined with respect to the axial direction, and thus it is possible to determine the rotation direction at the time of the push in the axial direction.

Here, the first through hole is a “through hole” penetrating the surface of female connector 2. However, the configuration is not limited to this. Instead, a groove may be provided on the back surface side of female connector 2 facing male connector 1. Even in this case, male connector 1 can be connected to female connector 2 by guiding projection 3, in a configuration where projection 3 is movable in the groove. In contrast, the first through hole as a “through hole” allows projection 3 to be visually recognizable from the external surface side of female connector 2, and this facilitates the guiding of projection 3, as compared with the groove that is not visually recognizable from the external surface side.

Here, a case has been described in which projection 3 is provided on the external surface side of male connector 1 and the groove is provided on the back surface side of female connector 2. However, the configuration is not limited to this, and the converse configuration may be adopted as well. For example, a groove may be provided on the external surface side of male connector 1, and a projection may be provided on the back surface side of female connector 2.

<Second Through Hole>

Insertion receiving part 24 may further include second through hole 5 that is continuous with end **26*b* of first through hole 4 on the side in the axial direction, along the in-plane direction of the side surface, and that extends in the circumferential direction substantially perpendicular to the axial direction, on the side surface extending in a direction intersecting the axial direction. That is, second through hole 5 extends from end 41 of first through hole 4 along side surface 2S of female connector 2 in circumferential direction D3 substantially perpendicular to the axial direction. Here, substantially perpendicular means an angle within a range of 90 degrees±5 degrees. Circumferential direction D3** may be perpendicular to the axial direction.

When projection 3 is fixed in the axial direction by second through hole 5, male connector 1 is connected to female connector 2. Further, it is possible to adjust the position of projection 3 along the circumferential direction by providing second through hole 5 to have a predetermined length in the circumferential direction. That is, projection 3 is configured to cause the position of projection 3 in circumferential direction D3 to be adjustable by being guided from first through hole 4 to second through hole 5. With this adjustment, it is possible to eliminate twisting of the tube due to the rotation of male connector 1. Second through hole 5 may be provided so as to form an angle of, for example, more than or equal to 20° with respect to the axis.

In FIGS. 1 and 3, second through hole 5 is provided so as to extend in a circumferential direction whose component is the same as a component in the circumferential direction of first through hole 4 from end **26*b* of first through hole 4 on the side in the axial direction. However, the configuration is not limited to this. Second through hole 5 may be provided so as to extend in a circumferential direction whose component is opposite to a component in the circumferential direction of first through hole 4. Second through hole 5 may further be provided so as to branch in two opposite directions from end 26*b* of first through hole 4 on the side in the axial direction. For example, second through hole 5 may be provided so as to have a T-shape with respect to first through hole 4**.

A protrusion may further be provided at the boundary between first through hole 4 and second through hole 5 such that projection 3 is not easily movable between first through hole 4 and second through hole 5. The configuration allows stable retention of projection 3 in second through hole 5.

Modified Example

Figure 7:
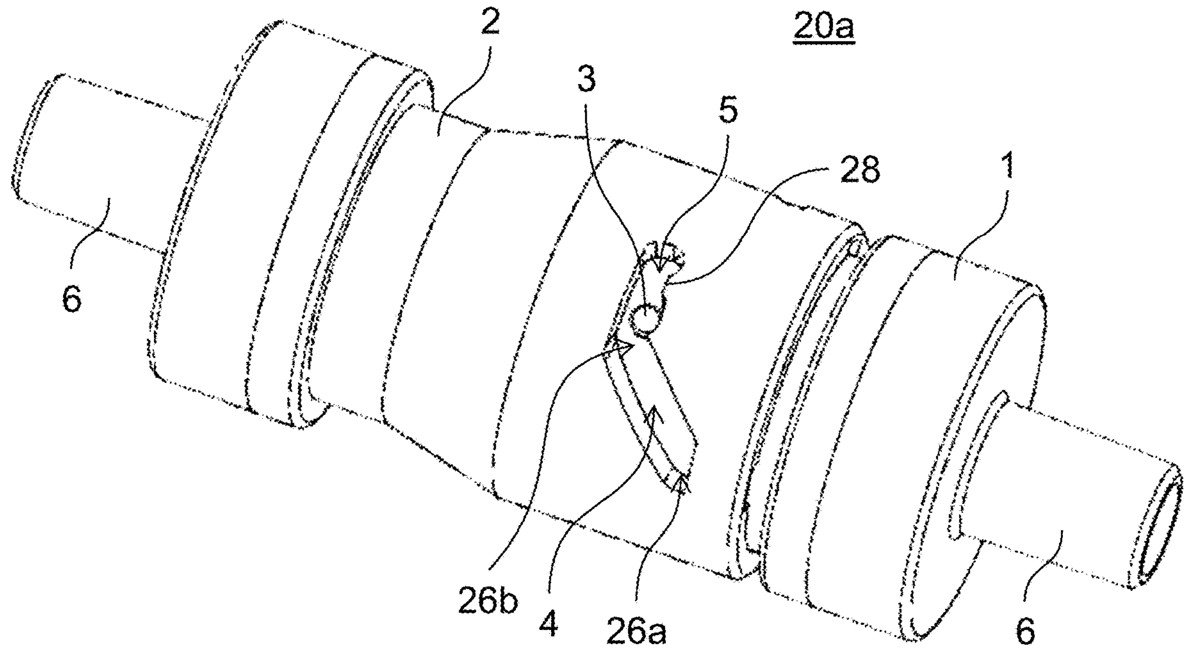
FIG. 7 is a schematic perspective view of the tube coupling, in a modified example, according to the first exemplary embodiment, the view illustrating an outer appearance of the tube coupling in the open state where the flow path in the tube coupling is opened.

As a modified example, one or a plurality of protrusions 28 may be provided in second through hole 5 such that projection 3 is not easily movable in the circumferential direction within the range of second through hole 5 (see, for example, FIG. 7). The configuration allows stable retention of projection 3 in second through hole 5.

A third through hole may further be included which is continuous with end **26*a* along the in-plane direction of the side surface, and which extends in the circumferential direction substantially perpendicular to the axial direction, on the side surface extending in a direction intersecting the axial direction. Here, end 26*a* is an end of first through hole 4, and is located on a side, in the insertion direction, from which insertion is made. As a result, male connector 1 can be stably retained in a state where male connector 1 is not pushed into female connector 2**.

The insertion receiving part may further include a plurality of first through holes and a plurality of second through holes on the side surface around the axial direction. Further, a degree of freedom in an insertion position in the rotation direction of the projection that corresponds to a position of one of the plurality of first through holes may be adjustable.

<Second Pressing Member>

Second pressing member 13 has a protruding shape protruding in the axial direction, and is biased outward in the axial direction by second spring 11 in a state where male connector 1 is not inserted into female connector 2. When male connector 1 is inserted into female connector 2, second pressing member 13 is caused to abut on first pressing member 9.

<Second Seal Member>

Second seal member 12 has an annular shape, and is disposed around second pressing member 13. For example, an O-ring can be used for second seal member 12.

<Second Outer Peripheral Member>

Second outer peripheral member 19 is biased in the axial direction (X-direction) by second spring 11. When male connector 1 is separated, second outer peripheral member 19 is caused to abut on second seal member 12, and this causes flow path 18 between first pipe 16 of male connector 1 and second pipe 17 of female connector 2 to be closed. As a result, the closed state is obtained.

In contrast, when second spring 11 is compressed, second outer peripheral member 19 is separated from second seal member 12, and this causes flow path 18 between first pipe 16 and second pipe 17 to be opened. As a result, the open state is obtained. Second outer peripheral member 19 is connected to second pressing member 13 via second spring 11. Thus, the relative position in the axial direction between second outer peripheral member 19 and second pressing member 13 changes in accordance with an extended state and a compressed state of second spring 11.

(Closed State)

In the closed state, male connector 1 is not completely inserted into female connector 2, as illustrated in FIG. 4. At this time, first pressing member 9 and second pressing member 13 are in abutment on each other, but do not press against each other. Thus, first spring 7 biases first pressing member 9, and second spring 11 biases second pressing member 13. In this case, first outer peripheral member 10 and first seal member 8 are caused to abut on each other, and second outer peripheral member 19 and second seal member 12 are caused to abut on each other. This causes flow path 18 between first pipe 16 and second pipe 17 to be closed.

(Open State)

In contrast, in the open state, male connector 1 is completely inserted into female connector 2, as illustrated in FIG. 2. At this time, first pressing member 9 and second pressing member 13 press against each other, and thus first spring 7 and second spring 11 are compressed. Therefore, the relative position of first pressing member 9 and second pressing member 13 in the X-direction with respect to first outer peripheral member 10 and second outer peripheral member 19 changes in the positive direction in the X-direction. As a result, first outer peripheral member 10 is separated from first seal member 8, and second outer peripheral member 19 is separated from second seal member 12. Thus, flow path 18 between first pipe 16 and second pipe 17 is opened, as indicated by arrows in FIG. 2. In this case, the direction of a flow in flow path 18 is not limited to a direction from first pipe 16 toward second pipe 17, and may be a reverse direction from second pipe 17 toward first pipe 16. Flow path 18 is defined between first outer peripheral member 10 and second outer peripheral member 19, and first seal member 8 and second seal member 12, around the respective outer peripheries of first pressing member 9 and second pressing member 13.

When first seal member 8 and second seal member 12 have the same diameter, as described in Japanese Patent No. 3482496, it is necessary to perform closing of first seal member 8 and second seal member 12 with a surface parallel to the axis. Thus, a space in which liquid remains is formed between first seal member 8 and second seal member 12.

In contrast, outer diameter R2 of second seal member 12 is smaller than outer diameter R1 of first seal member 8, as illustrated in FIG. 2. That is, inclined surfaces (tapering surfaces) are defined from first seal member 8 of male connector 1 to second seal member 12 of female connector 2.

The above configuration includes the inclined surfaces from first seal member 8 to second seal member 12, in contrast to the case where first seal member 8 and second seal member 12 have the same diameter. Thus, flow path 18 can be closed by causing a corresponding inclined surface of first outer peripheral member 10 to abut on first seal member 8, and by causing a corresponding inclined surface of second outer peripheral member 19 to abut on second seal member 12. Therefore, it is possible to reduce a space in which liquid remains between first seal member 8 and second seal member 12. As a result, it is possible to reduce liquid remaining between first seal member 8 and second seal member 12, thereby reducing liquid leakage at the time of disengagement of the male connector and the female connector.

<Outer Seal Member>

As illustrated in FIGS. 2 and 4, outer seal member 15 may be further included which performs sealing between first outer peripheral member 10 and second outer peripheral member 19, and annular member 14, of female connector 2, that surrounds the respective outer peripheries of first outer peripheral member 10 and second outer peripheral member 19. Outer seal member 15 is caused to abut on first outer peripheral member 10 or second outer peripheral member 19, and first outer peripheral member 10 and second outer peripheral member 19 are shifted in the axial direction with respect to outer seal member 15. Thus, outer seal member 15 has, for example, an X-shaped cross-section. Outer seal member 15 has an X-shaped cross-section, and thus comes into contact with first outer peripheral member 10 or second outer peripheral member 19 at two points in the axial direction. Therefore, axial sliding resistance is smaller than that of a seal member having a normal circular shape.

Outer seal member 15 performs sealing by being in abutment on first outer peripheral member 10 or second outer peripheral member 19. Thus, liquid leakage can be reduced even when first outer peripheral member 10 and second outer peripheral member 19 are shifted in the axial direction in accordance with changes between the closed state and the open state.

Modified Example

In a tube coupling according to a modified example, the outer diameters from first pressing member 9 to second pressing member 13 between first seal member 8 and second seal member 12 taper from outer diameter R1 of first seal member 8 to outer diameter R2 of second seal member 12.

With this configuration, it is possible to further reduce a space in which liquid remains between first seal member 8 and second seal member 12, and it is possible to further reduce liquid leakage at the time of disengagement.

Second Exemplary Embodiment

Figure 6A:
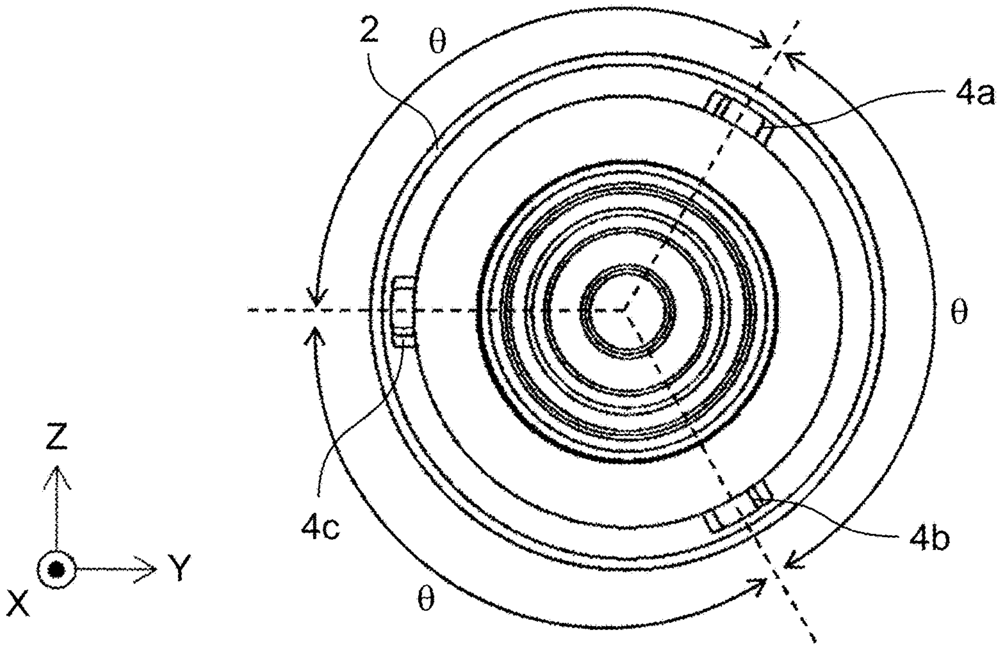
FIG. 6A is a cross-sectional view illustrating a female connector of a tube coupling according to a second exemplary embodiment, as viewed from the axial direction.
Figure 6B:
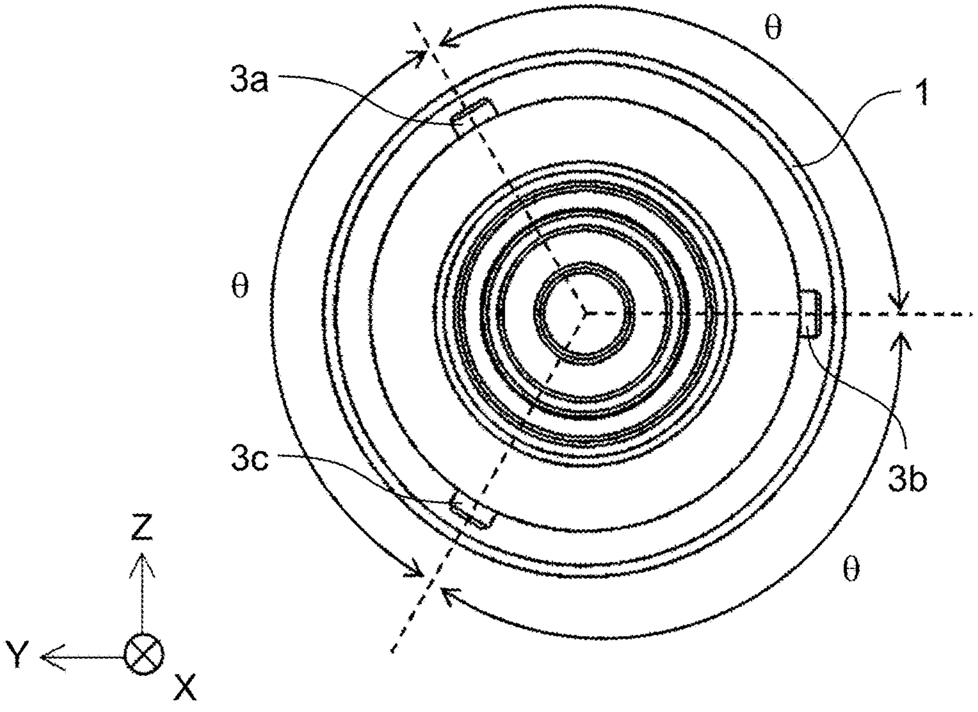
FIG. 6B is a cross-sectional view illustrating a male connector of the tube coupling according to the second exemplary embodiment, as viewed from the axial direction.

FIG. 6A is a cross-sectional view illustrating female connector 2 of a tube coupling according to a second exemplary embodiment, as viewed from the axial direction. FIG. 6B is a cross-sectional view illustrating male connector 1 of the tube coupling according to the second exemplary embodiment, as viewed from the axial direction.

In insertion receiving part 24 of female connector 2 according to the second exemplary embodiment, three first through holes 4*a*, 4*b*, 4*c* are provided equiangularly around the axis while they are disposed along the circumferential direction. In insertion part 22 of male connector 1 according to the second exemplary embodiment, three projections 3*a*, 3*b*, 3*c* are provided equiangularly around the axis while they are disposed along the circumferential direction. In this case, any of three projections 3*a*, 3*b*, 3*c* can correspond to any of three first through holes 4*a*, 4*b*, 4*c*.

As described above, the configuration is not limited to the case where one projection 3 and one first through hole 4 are provided, and the plurality of projections 3 and the plurality of first through holes 4 may be provided as illustrated in FIGS. 6A and 6B. The plurality of projections 3 and the plurality of first through holes 4 are not necessarily provided equiangularly around the axis. The angles may be different from one another. In this case, projections 3 and first through holes 4 have limitation in their corresponding counterparts, and also have limitation in insertion angles. Further, the number of projections 3 may be set smaller than the number of the plurality of first through holes 4. For example, when the number of first through holes 4 is three as illustrated in FIG. 6A, the number of projections 3 may be two. In this case, an angle between the plurality of projections 3 and an angle between the plurality of first through holes 4 may be set to match respective corresponding angles. With these settings, it is possible to adjust a degree of freedom in disposing projection 3 with respect to the plurality of first through holes 4. That is, two projections 3 are guided in the axial direction by two first through holes 4 of three first through holes 4.

Note that the present disclosure includes appropriate combination of any exemplary embodiment and/or example among the various exemplary embodiments and/or examples described above, and effects of the respective exemplary embodiments and/or examples can be achieved.

With the tube coupling according to the present disclosure, it is possible to insert the male connector into the female connector with a small force.

What is claimed is:

1. A tube coupling configured to connect and couple two tubes for fluid flow, the tube coupling comprising:

a male connector;

a female connector; and an outer seal member configured to seal the male connector and the female connector, wherein:

the male connector includes a first seal member, a first outer peripheral member, and an insertion part;

the female connector includes a second seal member, a second outer peripheral member, and an insertion receiving part;

the second seal member is configured to contact the second outer peripheral member in a closed state such that a flow path in the tube coupling is closed;

the outer seal member is configured to contact the second outer peripheral member in the closed state;

the outer seal member is configured to contact the first outer peripheral member in an open state such that the flow path in the tube coupling is open;

the insertion part has a protruding shape, and protrudes in an axial direction that is an insertion direction; and the insertion receiving part has a recessed shape, and is recessed in the axial direction and configured to be coupled to the insertion part upon insertion of the insertion part into the insertion receiving part.

2. The tube coupling according to claim 1, wherein the insertion part includes:

a first spring; and a first pressing member configured to be biased in the axial direction by the first spring when the male connector is not inserted into the female connector, wherein:

the first seal member is disposed around the first pressing member; and the first outer peripheral member supports the first spring in the axial direction.

3. The tube coupling according to claim 2, wherein the insertion receiving part includes:

a second spring;

the second outer peripheral member; and a second pressing member configured to be: (i) biased outward in the axial direction by the second spring when the male connector is not inserted into the female connector; and (ii) caused to abut on the first pressing member when the male connector is inserted into the female connector, wherein the second seal member is disposed around the second pressing member.

4. The tube coupling according to claim 3, wherein the first pressing member and the second pressing member have respective outer diameters that taper from the first seal member to the second seal member.

5. The tube coupling according to claim 1, wherein:

the insertion part includes a projection on a side surface of the male connector;

the insertion receiving part includes a through hole on a side surface of the female connector, the through hole being configured to receive the projection; and the male connector is configured to be connected to the female connector by inserting the projection into the through hole.

* * * * *